O. S. WILLIAMS.
SANITARY MILK PAIL.
APPLICATION FILED AUG. 9, 1909.
983,337.
Patented Feb. 7, 1911.
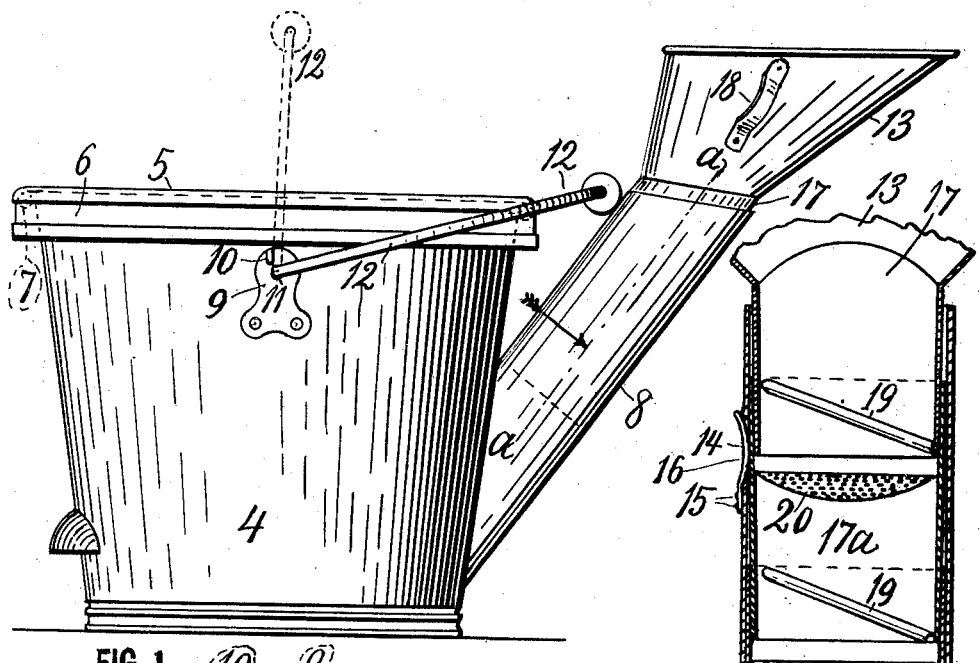
FIG. 1.
FIG. 3.
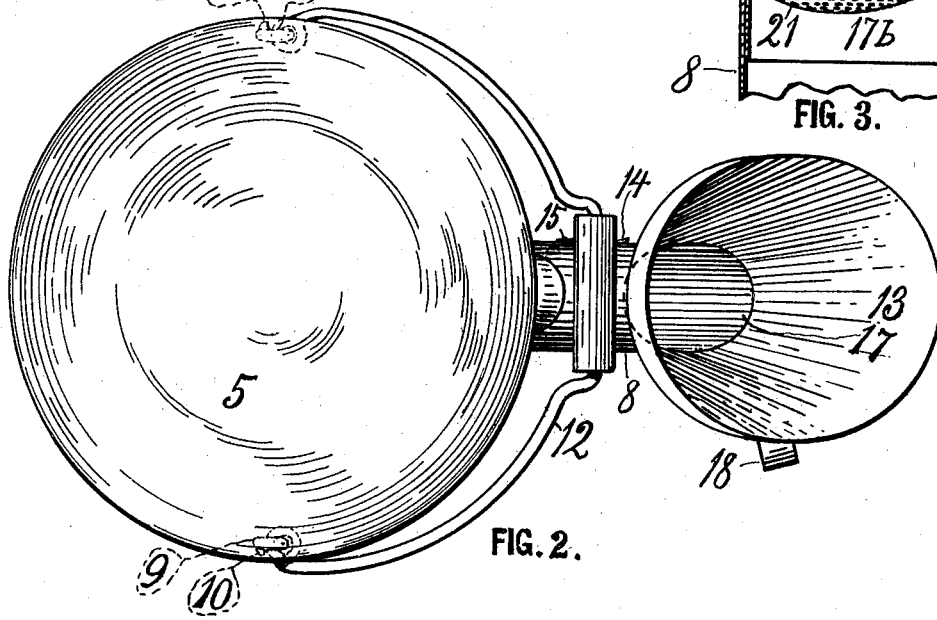
FIG. 2.
WITNESSES:
E. A. Johnson.
E. C. Carlsen.
INVENTOR:
Orlando S. Williams.
BY his ATTORNEY:
A. M. Carlsen.

UNITED STATES PATENT OFFICE.

ORLANDO S. WILLIAMS, OF SPRING VALLEY, WISCONSIN.

SANITARY MILK-PAIL.

983,337. Specification of Letters Patent. Patented Feb. 7, 1911.

Application filed August 9, 1909. Serial No. 512,033.

*To all whom it may concern:*

Be it known that I, ORLANDO S. WILLIAMS, a citizen of the United States, residing at Spring Valley, in the county of Pierce and State of Wisconsin, have invented a new and useful Sanitary Milk-Pail, of which the following is a specification.

My invention relates to milk pails and the principal objects are; firstly, to provide a milk-pail that will be held against overturning by being used as a seat for the person doing the milking, secondly, to provide a highly sanitary milk-pail.

With these and other objects in view the invention consists of the novel construction and features illustrated in the accompanying drawing in which, Figure 1 is a side elevation of my improved milk pail. Fig. 2 is a top view of the same, and Fig. 3 is an enlarged section on the line *a—a* in Fig. 1.

Referring to the drawing by reference numerals, 4 designates the milk-pail proper and is provided with a flat solid cover 5, having a vertical rim 6, to stiffen it and guide it down over the rim 7 of the pail, the latter rim, the cover and the whole pail being constructed of so heavy tin that the cover and the structure will safely support the operator for whom the cover serves as a seat and the pail as a combined milking stool and milk-pail.

At the front side of the pail is provided a cylindrical spout 8, through which the milk passes into and out of the pail.

At both sides of the pail are secured ears 9, each of which is provided with a lug 10 and a hole 11 in which a bail 12 has its ends inserted and bent over in about the usual manner for pail handles. The bail or handle 12 has its forward movement limited by the spout 8 and its rearward movement by the stopping lugs 10 when the bail is in a slightly forwardly leaning position, as shown in dotted lines in Fig. 1, in which position the bail when the pail is lifted by it helps to support the extra weight of the spout and its funnel 13 at the front side of the pail. The lugs further help to insure that the bail when idle will always be folded forwardly and thus be ready for the operator to grasp it in case the cow becomes unruly or he is through with the milking of it.

In the spout 8 is slidably inserted and friction-held by a spring arm 14, which is secured at 15 and curves into a slot 16 in the side of the spout, a tubular extension or stem 17 of the funnel 13.

18 is a finger hold at one side of the funnel by which to turn the funnel and regulate it to any desired height, the spring arm 14 yielding to such movements.

The stem of the funnel is composed of an upper section 17 near the funnel, a middle section $17^a$ and a lower section $17^b$, the three sections are partly telescoped into each other and firmly but detachably held together by intermeshing sections of steep screwthreads 19, which may be pressed inward so as to leave the outer sides of the sections unobstructed for insertion in the spout. In the upper end of section $17^a$ is fixed a strainer 20, and near the lower end of section $17^b$ is fixed another strainer 21, so that when the sections are detached from each other the strainers are easily accessible for cleaning from both ends of each section.

In the operation or use of the pail the operator takes his seat on the pail cover, adjusts the forwardly flaring funnel below the teats of the cow and then milks into the funnel, the milk passing into the pail through the two strainers will thereby be fully strained, while the cover 5 keeps out all dust and sand which might otherwise enter into the pail. When the milking is done the funnel with its stem and strainers is removed from the spout 8, and the milk is then poured out of the spout and into milk cans or other receptacles as the case may be, and the pail, the funnel and strainers cleansed for future use. The cover needs no handle as its rim projects sufficiently away from the sides of the pail to afford a good hold for the fingers in raising it.

Having thus described my invention what I claim is;—

1. In a milk-pail, the combination with a vessel having at its front side a spout, of a funnel having a hollow stem adjustably and removably held in said spout, two spaced strainers in said stem; the stem being made with two detachable sections partly telescoped together and carrying each of them one of the strainers, whereby the strainers may be easily reached for thorough cleansing.

2. A milk-pail having an inclined spout at one side, a funnel having a hollow stem adjustably held in the spout and provided with two spaced strainers, said stem of the funnel having its lower portion composed of two detachable and separable sections threaded into each other and carrying each of them one of the strainers.

In testimony whereof I affix my signature, in presence of two witnesses.

ORLANDO S. WILLIAMS.

Witnesses:
E. M. TOUSLEY,
K. A. OFSTIE.